(12) United States Patent
Dietz et al.

(10) Patent No.: US 7,641,781 B2
(45) Date of Patent: Jan. 5, 2010

(54) METHOD FOR COATING A SUBSTRATE

(75) Inventors: Andreas Dietz, Wolfenbuettel (DE); Gebhard Klumpp, Braunschweig (DE); Juergen Olfe, Volkse (DE)

(73) Assignee: MTU Aero Engines GmbH, Munich (DE)

( * ) Notice: Subject to any disclaimer, the term of this patent is extended or adjusted under 35 U.S.C. 154(b) by 386 days.

(21) Appl. No.: 10/534,376

(22) PCT Filed: Nov. 3, 2003

(86) PCT No.: PCT/DE03/03645

§ 371 (c)(1),
(2), (4) Date: Oct. 24, 2005

(87) PCT Pub. No.: WO2004/042113

PCT Pub. Date: May 21, 2004

(65) Prior Publication Data

US 2006/0127590 A1  Jun. 15, 2006

(30) Foreign Application Priority Data

Nov. 7, 2002 (DE) ................. 102 51 902

(51) Int. Cl.
| | |
|---|---|
| C23C 18/16 | (2006.01) |
| C23C 18/31 | (2006.01) |
| C23C 18/42 | (2006.01) |
| C23C 18/50 | (2006.01) |
| C25D 3/12 | (2006.01) |
| C25D 3/50 | (2006.01) |
| C25D 5/50 | (2006.01) |
| C25D 15/00 | (2006.01) |

(52) U.S. Cl. ................ 205/109; 205/224; 205/228; 427/376.4; 427/383.7; 427/437; 427/438; 427/443.1

(58) Field of Classification Search .......... 205/109
See application file for complete search history.

(56) References Cited

U.S. PATENT DOCUMENTS

| | | | |
|---|---|---|---|
| 3,102,044 A | | 8/1963 | Joseph |
| 4,627,896 A | * | 12/1986 | Nazmy et al. ............ 428/680 |
| 4,789,441 A | | 12/1988 | Foster et al. |
| 4,895,625 A | | 1/1990 | Thoma et al. |
| 5,650,235 A | * | 7/1997 | McMordie et al. ......... 428/610 |
| 5,935,407 A | | 8/1999 | Nenov et al. |

FOREIGN PATENT DOCUMENTS

| | | |
|---|---|---|
| DE | 35 35 548 | 4/1986 |
| DE | 37 16 935 | 12/1988 |
| DE | 37 16935 A1 * | 12/1988 |
| DE | 40 24 911 | 4/1991 |
| EP | 0 316 388 B1 * | 3/1991 |
| EP | 0 748 394 | 12/1996 |
| GB | 1 347 184 | 2/1974 |
| GB | 2 014 189 | 8/1979 |
| SU | 1 803 480 | 3/1993 |
| WO | WO 94/19583 | 9/1994 |
| WO | WO 00/36180 | 6/2000 |

* cited by examiner

*Primary Examiner*—Patrick Ryan
*Assistant Examiner*—William T Leader
(74) *Attorney, Agent, or Firm*—Kenyon & Kenyon LLP

(57) ABSTRACT

In a method for coating a substrate, and a coated object, in a first step, in an external current-less or electrolytic manner, nickel and/or cobalt and/or platinum are deposited on a substrate in a deposition bath. In the deposition bath, particles are additionally suspended which contain at least one metal selected from Mg, Al, Ti, Zn and no Cr, the particles becoming occluded in the coating. In a second step, the actual protective layer is produced by heat treatment. The coating of component parts may be used for aircraft turbines or gas turbines or for garbage incineration systems having temperature-resistant protective layers against high temperature corrosion.

6 Claims, No Drawings

METHOD FOR COATING A SUBSTRATE

FIELD OF THE INVENTION

The present invention relates to a method for coating a substrate and to a coated object. One field of application is the coating of components for aircraft turbines or gas turbines, or for garbage incineration plants having temperature-resistant protective layers against high temperature corrosion.

BACKGROUND INFORMATION

Components for use in aggressive, hot and corrosive conditions are mostly made of special high temperature alloys based on nickel or cobalt. These alloys are damaged during use, by high temperature corrosion. Due to the high temperatures and accelerated by the presence of even the smallest proportions of chlorine and sulfur, nickel and cobalt are converted to their oxides and sulfides. The oxides and sulfides of nickel and cobalt are, however, connected only loosely to the metallic undersurface, and scale off little by little.

It is known that nickel and cobalt alloys, beginning from a certain proportion of aluminum content, have an increased stability against high temperature corrosion. At high temperatures, these alloys develop on their surface a strongly adherent layer of aluminum oxide which regenerates by itself if the layer is damaged. In order to be able to select the base material according to strength criteria, methods for diffusion coating were developed, such as alitizing, by which the base alloy may be enriched retroactively with aluminum in the region near the surface.

An aluminization method is described in U.S. Pat. No. 3,102,044, in which a layer of aluminum is deposited on the component part. During the subsequent heat treatment, the aluminum melts and reacts with the substrate to form NiAl.

European Published Patent Application No. 0 748 394 describes an aluminide coating, enriched with platinum, that is modified with silicon. In order to prepare this layer, in a first step, platinum is deposited on the surface of a nickel superalloy. Subsequently, an aqueous suspension of pulverized elementary aluminum and silicon is applied and dried. Finally the aluminum is molten, whereupon the silicon dissolves and aluminum atoms and silicon atoms diffuse into the substrate.

Another protective layer against high temperature corrosion is made of MCrAlY (M=Ni, Co; CrAlY=chromium aluminum yttrium).

German Published Patent Application No. 35 35 548 describes a method for preparing a an MCrAlY coating. By galvanic dispersion deposition, a metal matrix is produced of Ni or Co having intercalated particles made of CrAlY. Upon subsequent tempering, the actual protective layer is then created.

SUMMARY

An example embodiment of the present invention may provide a simplified method for producing temperature-resistant protective layers based on aluminum-containing nickel, cobalt and/or platinum layers, and may make available an alternative protective layer against high temperature corrosion.

Further aspects and features of example embodiments of the present invention are described below.

According to an example embodiment of the present invention, in a method for coating a substrate, in a first step, nickel, cobalt and/or platinum are deposited on a substrate in a deposition bath, without using an external current or electrolytically. In the deposition bath, particles are additionally suspended which contain at least one metal selected from magnesium, aluminum, titanium, zinc, the particles becoming occluded in the coating. Possibly, but not necessarily, the particles do not include any chromium. In the second step, the actual protective layer against high temperature corrosion is produced by heat treatment.

In the method, the reduction of metal salts may take place electrolytically (i.e., by applying an outer current source, or without an external current, e.g., by the addition of chemical reducing agents.

In the electrolytic deposition, no chemical reducing agents or their reaction products or decomposition products are present in the deposition bath, that may be inserted into the metal layer that is created and that may contaminate it. If, for example, phosphorus-containing compounds are incorporated, phosphides may be created during the heat treatment which may make the layer brittle, and thereby sensitive.

The higher deposition speed as compared to the reduction without external current may also be advantageous.

In the case of greatly angular component parts, by deposition using chemical reducing agents, one may achieve the formation of a layer having uniform thickness even at the edges and other surface transition points. In such cases, electrolytic deposition supplies nonuniform layer thicknesses, since the electric field is nonhomogeneous because of shadowing processes.

Besides the usual component parts for an external current-free or electrolytic deposition, particles are suspended in the deposition baths of the method hereof, which contain at least one metal selected from magnesium, aluminum, titanium, zinc, and which are inserted into the metal layer being created.

A spatially uniform insertion of the particles is achieved by a homogeneous distribution of the suspended particles in the deposition bath, which may be ensured by various measures, such as stirring, shaking or the application of ultrasound, etc. Because of the spatially uniform insertion of the particles, it is possible to produce a layer having homogeneous properties. Devices and methods which may be used for this are described, for instance, in U.K. Published Patent Application Nos. 1 347 184 and 2 014 189.

In the second method step, the coated substrate undergoes heat treatment, e.g., at 600 to 800° C. During this treatment an alloy forms which contains the elements of the external current-free or electrolytically deposited layer and the elements from the particles. In addition, the atoms diffuse from the deposited layer and the particles into the substrate surface, which results in a better adherence of the layer to the substrate.

The quantity ratios of the deposited metals and particles may be chosen such that stable phases are created. If these ratios are not right, a heterogeneous two-phase mixture forms from an alloy-phase and a pure phase. This mixture demonstrates a somewhat worse resistance to hot gases, since it is attacked by intercrystalline corrosion.

If aluminum-containing particles are used, the heat-treated protective layer contains platinum, nickel aluminide and/or cobalt aluminide which, under high temperature conditions and in the presence of oxygen, forms aluminum oxide layers that stick to the surface and are resistant to corrosion. The presence of noble metals, such as platinum, in the diffusion layer gives rise to the formation of an oxide layer that is almost fault-free. Aluminum may also be totally or partially replaced by magnesium, titanium or zinc. These metals have the property that they form well-adhering oxide layers at high temperatures, in the presence of oxygen.

The method according to an example embodiment of the present invention may be carried out rapidly, simply and using little expenditure in equipment technology, because the necessary elements, which are required for the formation of the protective layer, may be able to be applied to the substrate in one working step.

The protective layer produced by the method according to an example embodiment of the present invention may turn out to be so flat that the surface may have to be touched up very little or not at all. A smooth, aerodynamically favorable surface may be important for, e.g., turbine parts, in order to achieve great efficiency.

In an example embodiment of the method, particles may be used that are made of a single elementary metal.

Elementary, in the present context, means that the particles used may also have a thin oxide layer which, because of the non-noble character of magnesium, aluminum, titanium and zinc are created spontaneously under normal environmental conditions, but no additionally applied oxide layer and no additional components.

These particles may be simple and cost-effective to produce, using conventional instructions.

In an example embodiment of the method, particles may be put in that have an oxide layer which is thicker than the oxide layer formed under normal environmental conditions.

An oxide layer having the thickness mentioned brings on a greatly improved chemical stability of the particles in acid and basic deposition baths, e.g., in the pH range between 4 and 9. The deposition baths used may therefore be used longer before having to be changed.

Besides, the use of these chemically more stable particles does not limit the choice of the deposition bath used, since that deposition bath may be selected which supplies the metal layers having the best properties, and the deposition bath does not have to be selected according to whether the particles used in it are stable.

Magnesium, aluminum, titanium and zinc are non-noble metals which are not stable under acid conditions, but which dissolve as metal ions. Aluminum and zinc also dissolve under basic conditions because of their amphoteric character, as aluminate or zincate. The solution of the particle in the deposition bath has the effect that interfering foreign substances gradually accumulate in the bath. The baths set for the purpose of an optimal deposition result are toxified in a creeping manner. As a result, the efficiency of deposition may become worse. In addition, layers that are more and more porous are formed, since the increasing development of hydrogen interferes with the formation of a smooth, uniform layer of high density.

The oxide layer may be at least twice as thick as the oxide layers that magnesium particles, aluminum particles, titanium particles and zinc particles form spontaneously under normal environmental conditions.

Magnesium particles, aluminum particles and zinc particles having an oxide layer of at least 0.3 μm in thickness may have an especially good chemical stability.

Conventional methods for producing the oxide layer may be employed. A simple method is the reaction of the metal particles with hot water. In order to improve the thickness and the density of the oxide layer, inhibiting or complexing additives may be used. Examples include carbonates, silicates, phosphates, etc. Oxidizing agents such as persulfate compounds or chromates may also increase the thickness and the density of the oxide layer. Aluminum particles may be provided with an oxide layer according to the Alrok method, in which sodium carbonate and potassium dichromate are used, or according to the Erftwerk method, in which sodium carbonate, sodium chromate and sodium silicate are used.

The layer thickness of the oxide skin should be thin enough that the particle receives a sufficient proportion of elementary metal, so that the subsequent formation of an alloy with nickel, cobalt or platinum is not interfered with.

In an example embodiment of the method, magnesium particles, aluminum particles, titanium particles and/or zinc particles may be used that are alloyed with nickel, cobalt and/or platinum.

These particles may be relatively stable in acid and basic deposition baths having a pH value between 3 and 10. As was explained above, one may therefore choose between a greater number of deposition baths.

Furthermore, in this manner additional components may be introduced for the subsequent alloy formation in the tempering process. This makes possible a still greater freedom of choice in the selection of the deposition bath, since the conditions have to be optimized only for the deposition of a metal.

In an example embodiment of the method, silicon particles may additionally be suspended in the deposition bath, which become occluded in the coating.

The heat-treated, silicon-modified layer is more ductile than layers without silicon, and therefore demonstrates a lower tendency to crack formation.

Silicon may also be introduced into the coating by using magnesium particles, aluminum particles, titanium particles and/or zinc particles that are alloyed with silicon.

Besides the quantities used, the ratio in which the particles are inserted into the layer is a function of additional parameters, such as the speed of settling in the deposition bath. In the case of particles that contain alloys, this quantity ratio is established ahead of time. Thereby, the problem arising in connection with using particles made of different materials, e.g., of a different rate of insertion, may be avoided. In an example embodiment of the method, the layer may be deposited up to a thickness of 10 to 100 μm, e.g., 30 to 70 μm.

Layers produced using the method hereof, e.g., those having a thickness of 10 to 100 μm, may have excellent corrosion resistance.

In an example embodiment of the method, particles having a diameter of 1 to 50 μm, e.g., 5 to 20 μm, may be used.

Particles of this size may be suspended in homogeneous distribution in the deposition bath. This fulfills a prerequisite for a spatially uniform insertion of the particles into the deposited layer.

Particles that are smaller than 1 μm tend to aggregation when in suspension, that is, they form clusters. Bigger particles than 50 μm, even when they are able to be suspended homogeneously, which becomes more and more difficult with increasing size, lead to nonuniform spatial distribution of the particle material in the layer, since they are large compared to the layer that has a thickness of 10 to 100 μm. Basically, magnesium-containing, aluminum-containing and titanium-containing particles, because of their lower density, may be selected to be larger than zinc-containing particles.

An example embodiment of the method will be explained in greater detail in the light of the following non-limiting example.

Component parts of a cooling system are coated so as to be resistant to hot gas corrosion. The component parts, which are made up of a Ni-based alloy, are degreased by ultrasound cleaning, are pickled and provided with a 0.5 μm layer made of strike nickel. Using a galvanic Ni electrolyte, which contains particles made of an Al88Si12 alloy having a diameter of 3 μm in a concentration of 10 g/l, a dispersion layer is deposited. At a current density of 500 A/m² and moderate electrolyte motion and component part motion, a layer of a thickness of 30 μm is applied. By REM measurement (REM=Rasterelektronenmikroskop (scanning electron microscope)), it may be shown that 25% by volume of the deposited layer is made up of AlSi particles. A two-hour tempering process at 750° C. follows for the formation of the desired alloy layer.

What is claimed is:

1. A method for coating a substrate, comprising:
    one of (a) external currentless and (b) electrolytic deposition of at least one of (a) Ni, (b) Co and (c) Pt in a deposition bath in which metallic particles including at least one of substantially elemental (a) Mg, (b) Ti and (c) Zn, and not including Cr, are suspended, the metallic particles becoming occluded in the coating; and
    heat treating the coated substrate;
    wherein the deposition bath includes suspended particles consisting of silicon, the particles consisting of silicon becoming occluded in the coating.

2. The method according to claim 1, wherein the metallic particles include an oxide layer thicker than an oxide layer developed under normal environmental conditions.

3. The method according to claim 1, wherein the metallic particles are alloyed with at least one of (a) Ni, (b) Co and (c) Pt.

4. The method according to claim 1, wherein the metallic particles are alloyed with Si.

5. The method according to claim 1, wherein a diameter of the metallic particles is 1 to 50 μm.

6. The method according to claim 1, wherein the coating is deposited to a thickness of 10 to 100 μm.

* * * * *

UNITED STATES PATENT AND TRADEMARK OFFICE
CERTIFICATE OF CORRECTION

PATENT NO. : 7,641,781 B2 Page 1 of 1
APPLICATION NO. : 10/534376
DATED : January 5, 2010
INVENTOR(S) : Dietz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 629 days.

Signed and Sealed this

Sixteenth Day of November, 2010

David J. Kappos
*Director of the United States Patent and Trademark Office*